March 14, 1961
W. G. VAN DER HOVEN
2,974,359
PRESSURIZED SYSTEM FOR PRODUCING FIBERS
Filed Feb. 15, 1955
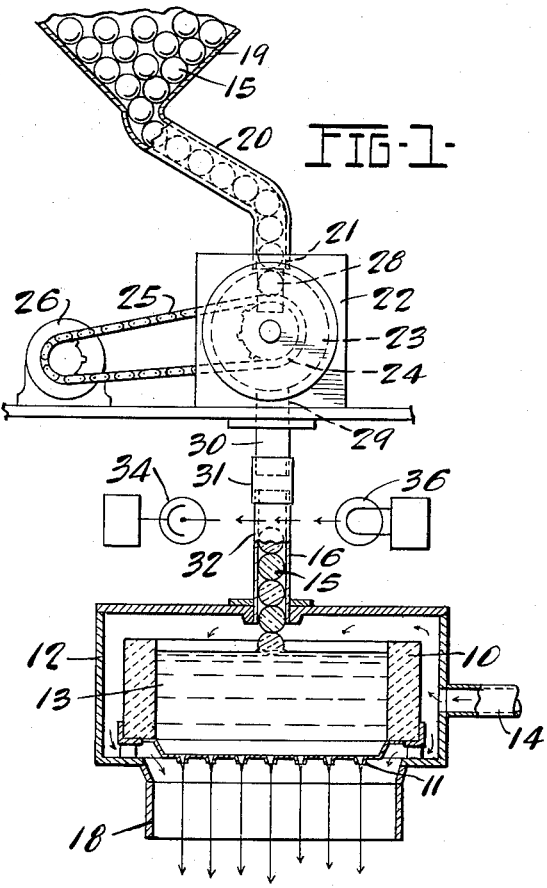
FIG-1-
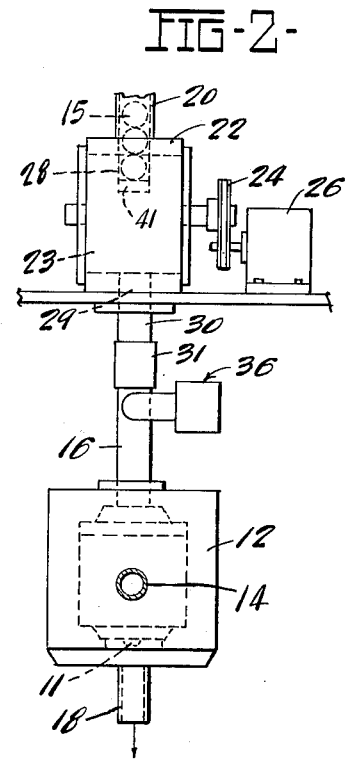
FIG-2-
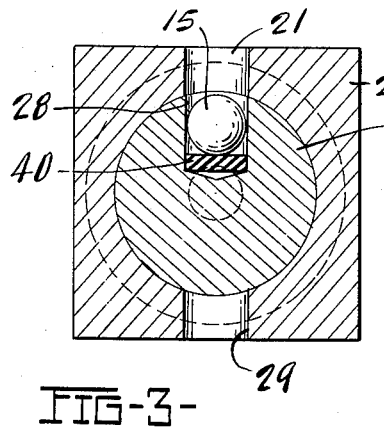
FIG-3-
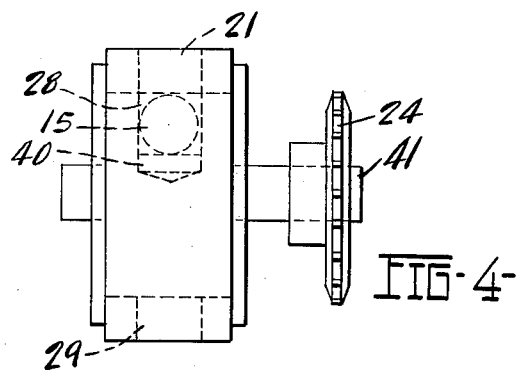
FIG-4-
INVENTOR:
WALTER G. VAN DER HOVEN.
BY
ATTYS.

United States Patent Office 2,974,359
Patented Mar. 14, 1961

2,974,359

PRESSURIZED SYSTEM FOR PRODUCING FIBERS

Walter G. Van Der Hoven, Providence, R.I., assignor to Owens-Corning Fiberglas Corporation, a corporation of Delaware Filed Feb. 15, 1955, Ser. No. 488,370

1 Claim. (Cl. 18—2.5)

This invention is related to the production of fibers and more particularly to a system for production of fibers of thermoplastic or heat softenable material in which the fibers are attenuated from the outlet orifices of a feeder containing molten material under pressure. In one established method of manufacture of fibers from thermoplastic or heat softenable material such as glass, the material in the feeder from which the fibers are emitted is desirably under gaseous pressure. In such instances the regulated introduction of material to the feeder without loss of pressure and without introduction of extraneous factors of operational instability presents a problem of sealing and regulated level control to which the present invention is directed as a solution. The invention is herein exemplified by a reference to a system for the manufacture of discontinuous glass fibers but it is to be understood and it will be recognized as the description progresses that the invention and the principles embodied therein have broader application in that it may be utilized in the manufacture of fibers of other heat softenable or thermoplastic materials such as resins and metals.

Further in this regard, the invention is described in relation to a system for producing glass fibers from marbles, but it is not limited solely to such a form for its basic supply, since the raw material may, in addition, be in the form of cullet or batch or combinations of these basic forms if desired.

In practice, the raw material introduced into a pressurized melting and fiber-feeding or forming unit is also required to be under pressure. All too often, however, the pressure system involving the raw material feed arrangement becomes cumbersome and complicated to the extent that maintenance against leaks and control of material flow in the pressure system becomes somewhat impractical.

It is an object of the present invention to provide a new and economical system for the production of fibers of thermoplastic or heat softenable material.

It is a more particular object of the invention to provide a simple more flexible raw-material supply system for pressurized fiber-forming apparatus which minimizes the amount of apparatus requiring pressurization and which is more readily adapted to control of flow of the material especially in the vicinity of the space in which actual melting of the raw material is effected.

It has been found that the height of the raw material or in an analogous sense, the weight of the raw material, being introduced directly into a feeder or bushing containing a molten body of the material with which the raw material is to be melted and mixed is important in determining the operational characteristics of the feeder unit. If the column or stack of raw material such as marbles is too high, the weight of the stack pressing against the surface of the molten body causes the cold, bottom-most portion of the stack to be pressed into the center of the molten mass. Under these conditions the center of the molten mass is presented with cold or undesirably cool material. This disturbs the dynamic thermal equilibrium conditions of the molten mass and is reflected in an unstable operation of the feeder unit as well as in dimensional and material nonuniformities in the fibers being produced. It has been found preferable that the batch be melted at the surface of the molten body where modifications in thermal conditions have less effect on the fibers being formed.

It is therefore another object of the present invention to provide a new system for supplying raw material to a melting and feeder unit wherein the raw material introduced to the molten body will melt more readily at the surface of the body.

More particularly, it is an object of the invention to provide a system for supply of raw material automatically maintained at a limited stacked height such that the bottom-most portions of the stack will not be pressed unduly below the level of the molten body.

A feature of the invention is its adaptability to automatic uniform feed of raw material to a feeder and consequent establishment of operational stability and production of fibers of more uniform properties than were heretofore possible in such systems.

Other objects and features which I believe to be characteristic of my invention are set forth with particularity in the appended claim. My invention itself, however, both as to its method of operation and manner of construction together with other objects and advantages, may best be understood by reference to the accompanying drawings, in which:

Figure 1 is a front-elevational view of a pressurized melting and feeder unit for the production of discontinuous glass fibers and a pressurized automatic stacked marble feed system therefor;

Figure 2 is a side-elevational view of the apparatus of Figure 1;

Figure 3 is an enlarged cross-sectional view of a sealed rotary feeder embodied in the general layout of apparatus illustrated in Figures 1 and 2; and Figure 4 is a side-elevational view of the feeder of Figure 3.

Turning to the drawings in greater detail, the general layout of apparatus in Figure 1 illustrates a glass melting unit 10 having an associated electrically heated feeder 11 in the bottom thereof from which streams of molten glass are emitted. The entire melting unit and associated feeder are encased within a pressurized jacket 12 sealed against the outer atmosphere except for an outlet in the bottom thereof and having a compressed-air inlet conduit 14 on one side thereof. Raw material in the form of marbles 15 is introduced by force of gravity from above the melting unit 10 through an inlet tube 16 to the melting unit to be melted down and mixed with the body of molten glass 13 contained therein.

The air under pressure introduced into the jacket flows past the bottom of the feeder 11 and through an outlet in the jacket 12 immediately below the feeder. The outlet is defined by a pair of skirts 18 extending in generally parallel spaced relationship a distance below the jacket sufficient to direct the flow of air emitted therefrom along with the fibers attenuated therethrough. The glass emitted from the bushing or feeder 11 flows through the opening defined by the skirts 18 and is attenuated by the air passing through the opening at high speed to form fine discontinuous fibers therefrom. By way of example, air may be introduced through the inlet conduit 14 at pressures ranging from 2 to 4 pounds per square inch. With such pressures and an opening formed by the skirts 18 in the order of a 2/16″ wide and 12″ long, the air passing through the skirts may be caused to have velocities in the order of 2400 feet per minute. Fibers produced in a unit having such characteristics may have diameters ranging from .00015″ to .00045″ and have random lengths in the range of from 1" to 24". The temperature of the feeder 11 for certain glasses may be in the order of 2800° F. to 2900° F. and accordingly the feeder must be made of high temperature resisting materials such as platinum. The feeder may have two rows of orifices numbering approximately 100 with each orifice being of size in the order of .05" in diameter.

In general the marble feed apparatus comprises a hopper 19 for the marbles 15 with a connected marble supply chute 20 leading therefrom. The chute 20 is connected with a pressure-barrier type, rotary marble feeder or, in other words, a rotary-seal feeder 22 having a rotor 23 with a drive sheave 24 driven by a chain belt 25 connected with a suitable speed-reduced, motor-drive unit 26. The rotary feeder 22 has an inlet channel 21 in registry with the end of the chute 20 to permit passage of one marble at a time to the top of the rotor 23. The rotor has a pocket 28 dimensioned to receive but a single marble at any one time and adapted to carry it through 180° to be deposited in an outlet channel 29 at the bottom of the feeder. The outlet channel 29 has an associated short nipple-like section of conduit 30 which extends a short distance below the marble feeder to a coupling 31 which acts to connect the outlet 29 with the tubular inlet 16 of the melting unit. The tubular inlet 16 is made of heat resistant transparent material preferably having a low coefficient of expansion such as "Pyrex" glass. The tube is made transparent so that a photoelectric cell electrically interconnected with the motor control circuit can be arranged for on-off regulated operation of the motor 26 to establish and maintain a predetermined marble level in the chute 16.

The rotor 23 fits snugly within the housing of the feeder 22 so that pressure backed up from the jacket 12 through the chute 16 will not extend beyond the marble feeder 23. Thus, practically all the air supplied through the conduit 14 will pass through the opening defined by the skirts 18.

The photoelectric cell 34 is located on one side of the transparent inlet tube 16 at a level predetermined to be that desired at which the marble stack therein is to be maintained. A light source 36 is located on the opposite side of the tube 16 from the photoelectric cell. The marbles 15 generally have sufficient coloration and/or light refraction to block the direct passage of a sufficient amount of light when present between the light source and photocell to cause the photocell to operate. The rotary feeder 22 is arranged to be driven by the motor 26 at a rate such that if operated continuously it would supply more than enough glass to the melting unit for a given predetermined fiber production rate. That is, the rotary feeder is arranged to operate at a rotary speed which will supply more glass in the form of marbles than the amount of glass being attenuated. Accordingly the photocell is arranged to halt operation of the motor 26 whenever the stack of marbles 15 reaches the preset level determined by the position of the photocell. The preset level of the photocell 34 and its associated light source 36 is arranged to be such that it will maintain the level of the glass column constant but limited in height sufficiently to prevent cold marbles at the bottom of the stack from being pushed prematurely into the body of the molten mass by the weight of the stack.

Figures 3 and 4 illustrate in more detail the construction of the rotary-seal feeder. The rotor 23 has an opening 28 of depth sufficient to permit placement of a cushioning pad made of material such as neoprene or rubber in the bottom thereof and also to permit receipt of but one marble therein. Thus, when the column of marbles in the chute 20 presses against the top of the rotor 23 it forces the bottom-most marble to drop into the pocket 28 while the rubber padding in the bottom thereof prevents the marble deposited therein from being subjected to excessive forces which might otherwise cause it to chip or break. The rotor 23 is driven by the pulley or sheave 24 connected with its drive shaft 41, and each marble deposited therein is carried through 180° for release in the feeder outlet channel 29 whereupon the rotor continues rotation through 360° for receipt of another marble. If, however, the stack of marbles reaches or exceeds the preset photocell level when a new marble is added to the stack the rotor is stopped generally within the vicinity of its 180° position until the stack lowers below the preset level whereupon the rotor is again rotated through another 180° for receipt of another marble.

While I have shown certain particular forms of my invention, it will be understood that I do not wish to be limited thereto since many modifications may be made within the concepts of the invention and I, therefore, contemplate by the appended claim to cover all such modifications which fall within the true spirit and scope of my invention.

I claim:

In combination in a pressurized staple fiber-forming unit to and from which material is arranged to be continuously supplied and removed respectively, a housing sealed against the outer atmosphere, means for supplying gas to said housing under pressure, said housing having an outlet in the bottom thereof from which the gas is emitted at high velocity, a melting container in said housing for melting down heat-softenable fiberizable material, a molten material supply feeder in the bottom of said container disposed above the outlet in said housing and through which the material from said feeder is arranged to be attenuated by the gas passing through the opening, means for introducing material to be melted to said container comprising a pressure-retaining material supply means adapted to supplying material to be melted to said container at a uniform rate from outside said housing, transparent channel means between said material supply means and said container through which the material to be melted is fed, said channel means being arranged so that the material fed therethrough is stacked on the molten material in said container and to a level within said channel, and photocell means associated with said transparent channel means for detection of a predetermined level of material stacked therein above said container, said photocell means being electrically interconnected with said supply means to stop the feeding of material to said channel when the level of material in said channel reaches said predetermined level and to restart such introduction when the material level falls below said predetermined level.

References Cited in the file of this patent

UNITED STATES PATENTS

| 1,445,300 | Daae | Feb. 13, 1923 |
| 1,977,969 | McIntosh | Oct. 23, 1934 |
| 2,286,903 | Dockerty | June 16, 1943 |
| 2,453,864 | Schlehr | Nov. 16, 1948 |
| 2,479,878 | Strelzoff | Aug. 23, 1949 |
| 2,482,071 | Simison | Sept. 13, 1949 |
| 2,635,285 | Toulmin | Apr. 21, 1953 |

FOREIGN PATENTS

| 429,795 | Great Britain | June 6, 1935 |